US009334945B1

(12) United States Patent
Smakal et al.

(10) Patent No.: US 9,334,945 B1
(45) Date of Patent: May 10, 2016

(54) VEHICLE DIFFERENTIAL ASSEMBLY

(71) Applicant: GM Global Technology Operations LLC, Detroit, MI (US)

(72) Inventors: Mark A. Smakal, Byron, MI (US); Laurie B. Davenport, Livonia, MI (US); John Dinovski, Leonard, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/645,804

(22) Filed: Mar. 12, 2015

(51) Int. Cl.
*F16H 57/04* (2010.01)
*F16H 57/027* (2012.01)
*F16H 57/037* (2012.01)
*F16H 57/02* (2012.01)

(52) U.S. Cl.
CPC ............ *F16H 57/027* (2013.01); *F16H 57/037* (2013.01); *F16H 57/0421* (2013.01); *F16H 57/0483* (2013.01); *F16H 2057/02052* (2013.01)

(58) Field of Classification Search
None
See application file for complete search history.

(56) References Cited

U.S. PATENT DOCUMENTS

| 5,316,106 | A | * | 5/1994 | Baedke | B60K 17/16 184/104.3 |
|---|---|---|---|---|---|
| 5,813,493 | A | * | 9/1998 | Sloan | F01M 13/0011 184/106 |
| 5,839,327 | A | * | 11/1998 | Gage | F16H 57/0412 184/11.1 |
| 6,073,443 | A | * | 6/2000 | Okada | F16H 39/14 60/456 |
| 7,052,429 | B1 | * | 5/2006 | Phanco | F16H 57/0447 475/161 |
| 8,715,127 | B2 | * | 5/2014 | Beutler | B60B 35/163 475/161 |
| 9,057,431 | B2 | * | 6/2015 | Okada | F16H 57/0483 |
| 9,103,429 | B2 | * | 8/2015 | Wiens | F02M 37/0088 |
| 2004/0231925 | A1 | * | 11/2004 | Matsushima | F01M 13/04 184/6.23 |
| 2005/0107202 | A1 | * | 5/2005 | Min | F16H 57/027 475/160 |
| 2007/0191168 | A1 | * | 8/2007 | Corless | F16H 57/0483 475/160 |

\* cited by examiner

*Primary Examiner* — Justin Holmes
(74) *Attorney, Agent, or Firm* — Cantor Colburn LLP

(57) ABSTRACT

An axle assembly having a differential gear set is provided. The axle assembly includes a housing cover having a first surface. A housing is provided having an interior portion sized to receive the differential gear set. The housing includes an end with a second surface, the second surface sized and shaped to engage the first surface. The end has an opening that extends from the second surface into the interior portion. The housing further includes a cavity formed in the second surface, the cavity defining a labyrinth passageway that fluidly couples the interior portion and an ambient environment, at least a portion of the passageway being defined by the housing cover.

20 Claims, 4 Drawing Sheets

VEHICLE DIFFERENTIAL ASSEMBLY

FIELD OF THE INVENTION

The subject invention relates to a vehicle differential assembly, and more particularly, to a vehicle differential assembly having a vent arrangement that reduces the risk of losing oil from within the differential housing during operation.

BACKGROUND

Vehicles, such as automobiles and trucks for example, include an axle assembly that transmits rotational energy developed by the vehicle engine to the wheels. The axle assembly will typically include a housing having both a hypoid ring and pinion gear set, and a differential gear set. The differential gear set includes a gear train that allows the wheels of the vehicle to turn at different rotational speeds. This allows an outer wheel to rotate faster than the inner wheel during a turn. The housing typically includes a sump that contains a lubricant. The lubricant is moved by one of the hypoid gears, such as the ring gear for example, that causes the lubricant to be distributed within the housing to lubricate the components.

During operation, the rotation of the ring gear causes the lubricant to flow within the housing. As a result of operation as well as changes in temperature, the pressure within the differential housing can increase or decrease (pull vacuum) during operation. Typically, a vent is affixed to or formed in the differential assembly housing. The vent provides a means of equalizing the pressure within the housing with the ambient environment. However, since the lubricant is flowing within the housing, there is a risk that some of the lubricant may be expelled from the differential housing resulting in a decrease in the lubricant level.

Accordingly, it is desirable to provide an axle assembly having a vent that equalizes the housing pressure while reducing the risk of lubricant loss.

SUMMARY OF THE INVENTION

In one exemplary embodiment of the invention, an axle assembly having a hypoid gear set is provided. The axle assembly having a housing cover having a first surface. A housing is provided having an interior portion sized to receive the hypoid gear set. The housing includes an end with a second surface; the second surface sized and shaped to engage the first surface, the end having an opening that extends from the second surface into the interior portion. The housing further includes a cavity formed in the second surface, the cavity defining a labyrinth passageway that fluidly couples the interior portion and an ambient environment, at least a portion of the passageway being defined by the housing cover.

In another exemplary embodiment of the invention, an axle assembly including a hypoid gear set having a ring gear is provided. The axle assembly further includes a housing cover having a first surface. A housing is provided having an interior portion sized to receive the hypoid gear set, the housing having an end with a second surface. The second surface is sized and shaped to engage the first surface. The end has an opening that extends from the second surface into the interior portion. The housing further includes a cavity formed in the second surface; the cavity cooperates with the first surface to defining a passageway having an entrance that fluidly couples the interior portion and an ambient environment, the entrance being closer to a side of the housing than to the ring gear.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
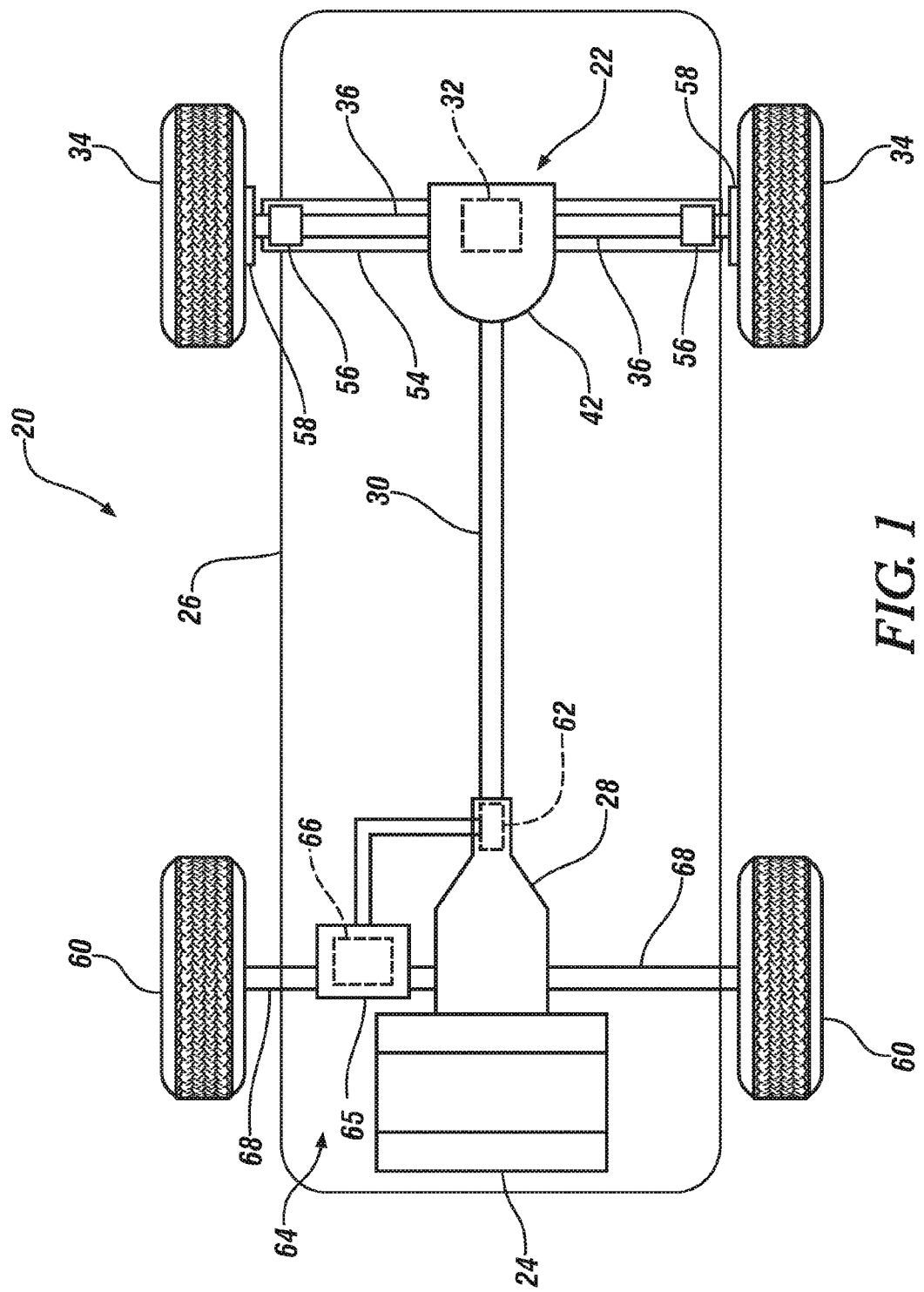
FIG. 1 is a top schematic view of a vehicle having an axle assembly in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an embodiment of the invention, FIG. 1 illustrates a vehicle 20 having an front axle assembly 64 and rear axle assembly 22. It should be appreciated that the vehicle 20 may be an automobile or a truck for example. The vehicle 20 may include an engine 24, such as a gasoline or diesel fueled internal combustion engine. The engine 24 may further be a hybrid type engine that combines an internal combustion engine with an electric motor for example. The engine 24 and axle assemblies 22, 64 are coupled to a frame or chassis 26. The engine 24 is coupled to the axle assembly 22 by a transmission, transfer case or coupling 28 and a driveshaft 30. The transmission 28 may be configured to reduce the rotational velocity and increase the torque of the engine output. This modified output is then transmitted to the axle assembly 22 via the driveshaft 30. The axle assembly 22 transmits the output torque from the driveshaft 30 through a hypoid gear set 32 to a pair of driven-wheels 34 via axles 36 and wheel flanges 58.

The rear axle assembly 22 includes a differential housing 42 that supports the hypoid gear set 32. As used herein, the hypoid gear set 32 includes a ring gear, a pinion gear and a differential case. The differential case may include a differential gear set assembly as is known in the art for transmitting torque from the ring gear to the axles. In one embodiment, a pair of axle tubes 54 are coupled to and extend from the differential housing 42. One or more wheel bearings 56 may be disposed at an end of the axle tube 54 distal from the differential housing 42 to support the axles 36.

The vehicle 20 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 60, 34 respectively. The transfer case 62 transmits a portion of the output to the front axle assembly 64, which may include additional components such as a differential housing 65, a hypoid and or differential gear set 66 and shafts 68 that transmit the output to the wheels 60.

Figure 2:
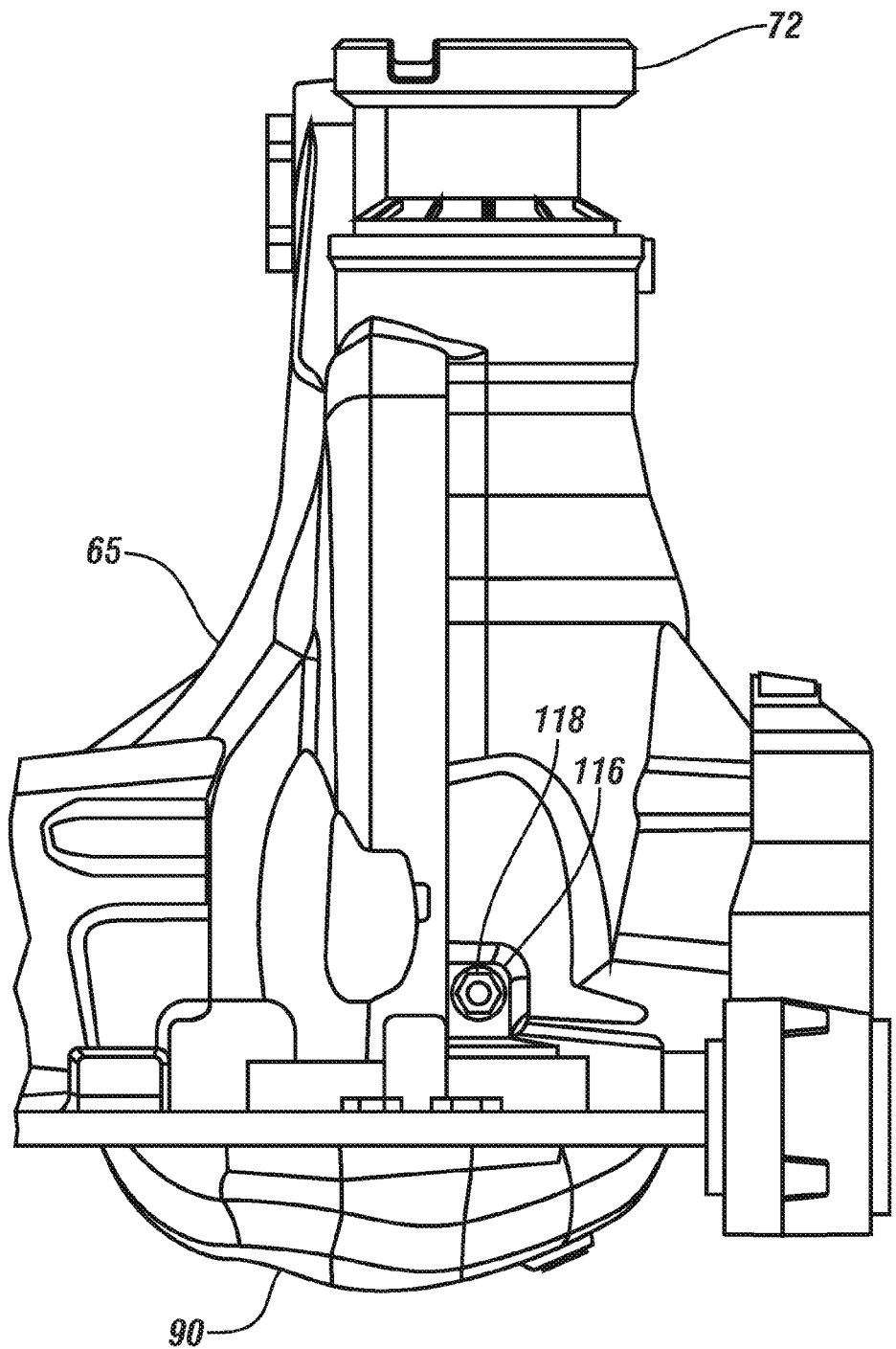
FIG. 2 is a top view of an axle assembly for use in the vehicle of FIG. 1.
Figure 3:
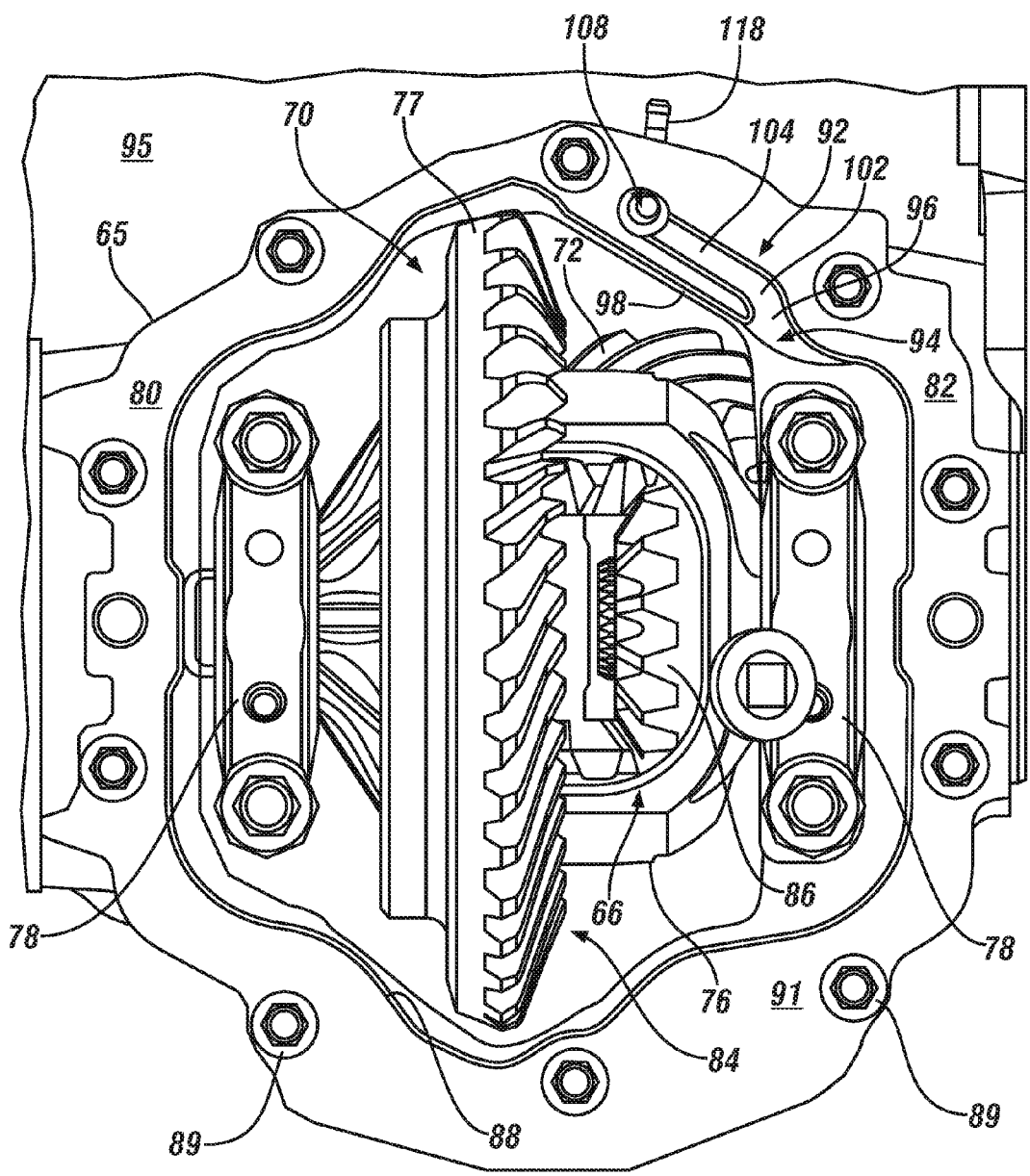
FIG. 3 is an end view of the axle assembly of FIG. 2 with a cover removed.

Referring now to FIGS. 2 and 3 with continuing reference to FIG. 1, front axle assembly 64 will be described. It should be appreciated that while embodiments herein describe the claimed invention with respect to the front axle assembly, this is for example purposes and the claimed invention should not be so limited. In other embodiments, the claimed invention may be the rear axle assembly. The differential gear set 66 is arranged within an interior portion 70 of a differential housing 65. The differential gear set 66 receives the output from the transfer case 62 via a pinion 72 that transmits the torque to a ring gear 77. The gearing arrangement of the differential gear set 66 is arranged within a case 76. The differential gear set 66 is supported for rotation within the housing 65 by a pair of differential bearings 78 that are coupled to the case 76 adjacent the first side 80 and second side 82 of the differential housing 65. In one embodiment, the ring gear 77 is offset from the center of the housing 65 towards the first side 80. The differential gear set 66 includes side gears 86 arranged within the case 76 that are coupled to and support one end of the shafts 68.

The housing 65 further includes a sump portion 84 arranged within the interior portion 70. The sump 84 contains a lubricant (not shown) that flows within the housing 65 in response to the rotation of the ring gear 77 to lubricate the internal components during operation. The housing 65 includes an opening 88 that allows access to the interior portion 70. The opening 88 is enclosed by a cover 90 (FIG. 2). A seal, such as a gasket or a room temperature vulcanization silicone (RTV) seal for example, may be disposed between the housing 65 and the cover 90. The cover 90 may be secured to the end surface 91 by fasteners 89.

It should be appreciated that as the ring gear 77 is rotated within the housing 65, lubricant within the sump portion 84 is dispersed within the interior portion 70. This allows the lubrication of the gears, such as the pinion 72 and differential gear set 66, and the bearings 78 for example. In the rear axle assembly 22, the distribution of the lubricant also allows for bearings 56 to be lubricated as well. To equalize the pressure of the housing 65 with ambient pressure, a vent 92 is fluidly coupled between the interior portion 70 and the environment 95. In one embodiment, the vent 92 is coupled to a conduit (not shown), such as a hose or tube for example, that allows the connection with the ambient environment 95 remote from the housing 65.

Figure 4:
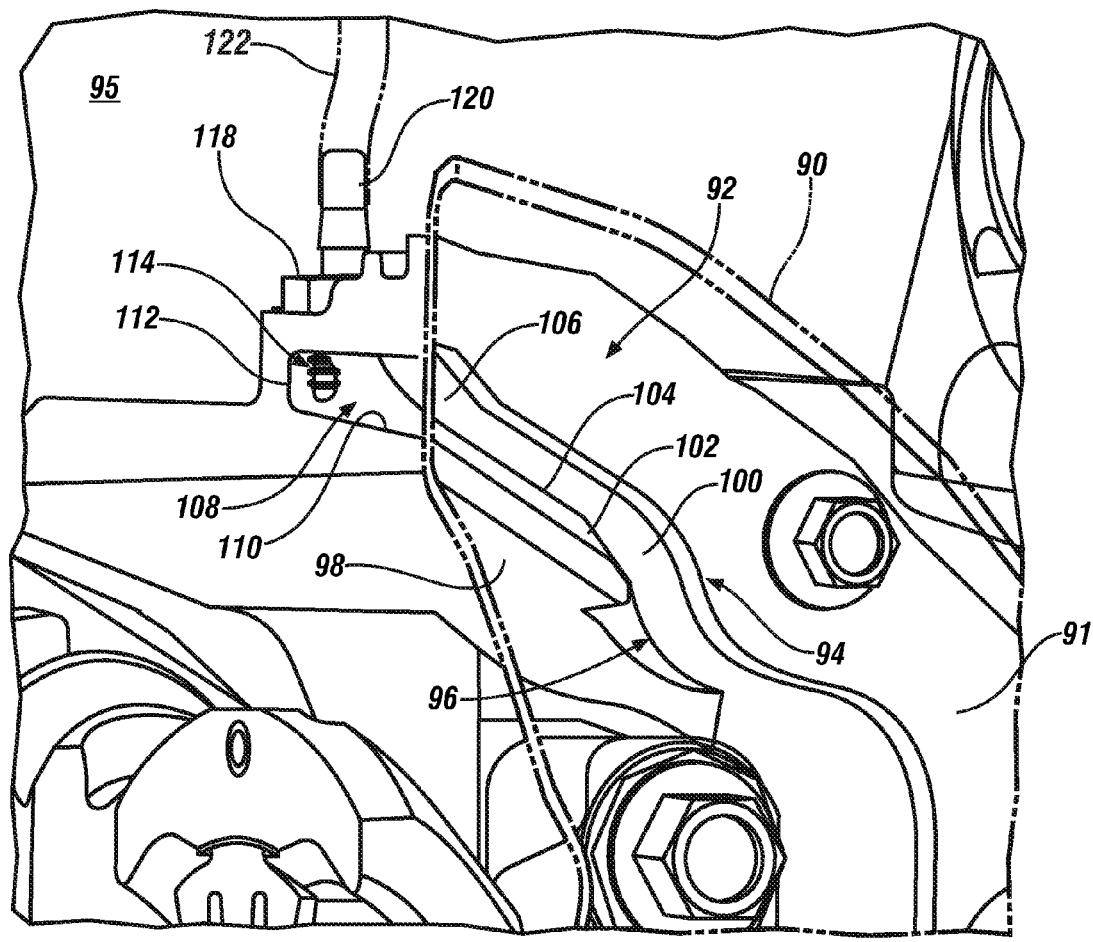
FIG. 4 is an enlarged perspective view of the vent portion of the axle assembly housing of FIG. 1.

Referring now to FIG. 4, with continuing reference to FIG. 3, an embodiment is shown of a cavity formed into the end surface 91 that defines a passageway for vent 92. In this embodiment, one side of the passageway is defined by the cover 90. The passageway of vent 92 includes an entrance 94 having an opening 96 and extends upward away from the interior surface 98 of the housing 65. The opening 96 has a first cross-sectional area that is larger than a distal end 100 of the entrance 94. In one embodiment, the opening 96 is elongated and follows the contour of the interior surface 98. The depth of the entrance 94 from the end surface 91 to the back surface 102 of the entrance 94 is sufficient to avoid blockage of the entrance 94 in the event that the seal or sealant disposed between the end surface 91 and the cover 90 is squeezed into the vent area.

In an embodiment, the opening 96 is arranged adjacent a top portion of the differential bearing 78 adjacent the second side 82 of housing 65. This arrangement provides several advantages in that the position of the opening 96 is further from the ring gear 77 when compared with the positioning of a passageway closer to the first side 80. This due to the position of the ring gear 77 being offset towards the first side 80 by the pinion 72. The arrangement of the opening 96 adjacent the differential bearing 78 provides still further advantages in that the flow of lubricant by the ring gear 77 may create a mist or stream of lubricant that flows about the periphery of the interior portion (centered on the ring gear 77). The differential bearing 78 interrupts this mist or stream of lubricant, thus reducing the risk of lubricant flowing into the passageway of vent 92.

The vent 92 also includes a channel portion 104 that extends from the distal end 100. In one embodiment, the channel portion 104 has a substantially uniform width that extends linearly in parallel with the interior surface 98. The channel portion 104 may be tapered or angled (relative to the centerline of the shafts 68) to allow lubricant that splashes or lubricant mist that settles in the channel portion 104 to flow under the influence of gravity back into the interior portion 70. In one embodiment, the angle of the first portion is about 31 degrees relative to the centerline or axis of the shafts 68. In one embodiment, the channel portion 104 includes a channel end 106 opposite end 100 that is enlarged relative to the remainder of the channel. It should be appreciated that the back surface 102 (e.g. the surface opposite the cover 90) remains generally parallel to the end surface 91 through the entrance 94 and channel portion 104.

Extending from the channel end 106 the passageway includes a vent portion 108. In one embodiment, the vent portion 108 extends into the housing 65 in a direction away from the end surface 91. In one embodiment, this direction may be generally perpendicular to the end surface 91. The vent portion 108 includes a lower surface 110 that tapers from an end 112 to the channel end 106. The taper of surface 110 allows for the draining or flow of any lubricant or lubricant mist that migrates into the vent portion 108 and back into the interior portion 70. In one embodiment, the angle of the lower surface is about 1.5 degrees relative to a plane that is perpendicular to the end surface 91.

The end 112 intersects, at least partially, with a vent bore 114. In an embodiment, the vent bore 114 extends away from the interior portion 70 through a top surface 116 (FIG. 2) of the housing 65. The vent bore 114 includes a threaded surface (not shown) that is configured to receive and retain a vent fitting 118. The vent fitting 118 may include a barbed surface 120 that is configured to retain a conduit 122, such as a flexible hose or tube for example. In the illustrated embodiment, the vent fitting 118 adapts and facilitates the coupling of the conduit 122 to the vent 92. In other embodiments, the vent fitting 118 may be a pressure relief valve, sometimes referred to as a jiggle cap. The vent fitting 118 fluidly couples the passageway of vent 92 and thus the interior portion 70 to the ambient environment 95. In an embodiment, the vent bore 114 is laterally offset in the vent portion 108 and only partially intersects with the vent portion 108. In another embodiment, the vent bore 114 extends through the end 112 and fully intersects with the vent portion 108. In still another embodiment, the vent portion 108 is removed from the passageway and the vent bore 114 is fluidly coupled directly to the end 106 of channel portion 104.

It should be appreciated that the passageway of vent 92 cooperates with the vent fitting 118 to define a labyrinth fluid path that allows the pressure within the housing 65 to equalize with the ambient environment while reducing the risk of lubricant being lost through the vent.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An axle assembly having a hypoid gear set, the axle assembly comprising:
   a housing cover having a first surface;
   a housing having an interior portion sized to receive the hypoid gear set, the housing having an end with a second surface, the second surface sized and shaped to engage the first surface, the end having an opening that extends from the second surface into the interior portion, the housing further having a cavity formed in the second surface, the cavity defining a labyrinth passageway that fluidly couples the interior portion and an ambient environment, at least a portion of one side of the labyrinth passageway being defined by and enclosed by the housing cover.

2. The axle assembly of claim 1 wherein the labyrinth passageway is formed in a top portion of the second surface.

3. The axle assembly of claim 1 wherein the labyrinth passageway comprises:
   an entrance that is fluidly coupled to the interior portion of the housing;
   a channel portion of the cavity extending from the entrance towards the top of the housing, one side of the channel portion being enclosed by the housing cover;
   a vent portion extending from the channel portion in a direction away from the second surface into the housing; and
   a vent bore fluidly coupled between the vent portion and a top surface of the housing.

4. The axle assembly of claim 3 wherein the channel portion includes a first end adjacent the entrance and a second end adjacent the vent portion, wherein the second end is closer to the top surface of the housing than the first end.

5. The axle assembly of claim 4 wherein:
   the housing includes a first side and an opposing second side;
   the hypoid gear set includes a ring gear, the ring gear having teeth formed on one side, the ring gear teeth being disposed closer to the first side than the second side; and
   the entrance to the labyrinth passageway is positioned between the ring gear teeth and the second side.

6. The axle assembly of claim 5 wherein the vent portion is arranged on an angle about 31 degrees relative to an axis of the ring gear.

7. The axle assembly of claim 6 wherein the vent portion tapers from the vent bore to the first channel portion.

8. The axle assembly of claim 4 further comprising at least one differential bearing configured to rotationally support the hypoid gear set in the housing, the at least one differential bearing being positioned adjacent the labyrinth passageway entrance.

9. The axle assembly of claim 8 further comprising a vent fitting coupled to the vent bore, the vent fitting having a barbed surface on one end.

10. An axle assembly having a hypoid gear set having a ring gear, the ring gear having teeth formed on one side, the axle assembly comprising:
    a housing cover having a first surface;
    a housing having an interior portion sized to receive the hypoid gear set, the housing having an end with a second surface, the second surface sized and shaped to engage the first surface, the end having an opening that extends from the second surface into the interior portion, the housing further having a cavity formed in the second surface, the cavity cooperates with the first surface to defining a passageway having an entrance that fluidly couples the interior portion and an ambient environment, the entrance being between a side of the housing and the ring gear teeth;
    wherein for at least a portion of the cavity one side of the cavity is enclosed by the housing cover.

11. The axle assembly of claim 10 wherein the passageway includes:
    a channel portion extending from the entrance towards a top surface of the housing, a side of the channel portion being enclosed by the housing cover;
    a vent portion extending from an end of the first portion in a direction substantially perpendicular to the second surface; and
    a vent bore fluidly coupled between the vent portion and the top surface.

12. The axle assembly of claim 11 wherein the vent portion includes a tapered surface arranged to flow a fluid in the vent portion into the first portion.

13. The axle assembly of claim 12 wherein the tapered surface is angled 1.5 degrees relative to a plane perpendicular to the second surface.

14. The axle assembly of claim 12 wherein the vent bore is substantially perpendicular to the vent portion.

15. The axle assembly of claim 14 further comprising a vent fitting coupled to said vent bore, the vent fitting having a barbed surface extending from the top surface of the housing.

16. The axle assembly of claim 11 further comprising at least one differential bearing coupled to the housing, the at least one differential bearing arranged to rotationally support the hypoid gear set.

17. The axle assembly of claim 16 wherein the entrance is proximate an end of the at least one differential bearing.

18. The axle assembly of claim 16 wherein the vent portion is arranged on an angle of about 31 degrees relative to an axis of the at least one differential bearing.

19. The axle assembly of claim 16 wherein:
    the housing includes a first side and a second side, the ring gear being positioned offset towards the first side; and
    the entrance is arranged proximate the second side.

20. The axle assembly of claim 10 wherein the entrance has a first end having a first cross-sectional area and a second end having a second cross-sectional area, the first cross-sectional area being larger than the second cross-sectional area.

* * * * *